US009167398B2

(12) United States Patent
Salonen

(10) Patent No.: US 9,167,398 B2
(45) Date of Patent: Oct. 20, 2015

(54) METHOD AND SYSTEM FOR COMBINING TEXT AND VOICE MESSAGES IN A COMMUNICATIONS DIALOGUE

(71) Applicant: BOOKIT OY AJANVARAUSPALVELU, Helsinki (FI)

(72) Inventor: Jukka Kalevi Salonen, Luhtajoki (FI)

(73) Assignee: BOOKIT OY AJANVARAUSPALVELU, Helsinki (FI)

(*) Notice: Subject to any disclaimer, the term of this patent is extended or adjusted under 35 U.S.C. 154(b) by 0 days.

(21) Appl. No.: 14/528,702

(22) Filed: Oct. 30, 2014

(65) Prior Publication Data
US 2015/0057036 A1    Feb. 26, 2015

Related U.S. Application Data

(63) Continuation of application No. 13/548,260, filed on Jul. 13, 2012, now Pat. No. 8,880,080, which is a continuation of application No. 12/226,876, filed as application No. PCT/FI2007/050230 on Apr. 26, 2007, now Pat. No. 8,260,330.

(30) Foreign Application Priority Data

May 2, 2006    (FI) .................................... 20060420

(51) Int. Cl.
*H04W 4/14* (2009.01)
*H04W 4/12* (2009.01)
*H04L 12/58* (2006.01)

(52) U.S. Cl.
CPC ........ *H04W 4/14* (2013.01); *H04W 4/12* (2013.01); *H04L 12/5895* (2013.01)

(58) Field of Classification Search
CPC ...... H04L 12/5895; H04W 4/12; H04W 4/14; H04M 3/42382
USPC ........... 455/445, 466, 414.4, 417; 379/88.18, 379/88.11–88.17
See application file for complete search history.

(56) References Cited

U.S. PATENT DOCUMENTS 5,592,666 A    1/1997 Perez
5,838,965 A    11/1998 Kavanagh et al.
(Continued)

FOREIGN PATENT DOCUMENTS

CN    1675637 A    9/2005
EP    0881802 A1    2/1998
(Continued)

OTHER PUBLICATIONS

Bmd wireless AG; Wirelss Application Messaging Serivce; Unknown 2004.
(Continued)

*Primary Examiner* — Kiet Doan
*Assistant Examiner* — Dung Lam
(74) *Attorney, Agent, or Firm* — Barnes & Thornburg LLP

(57) ABSTRACT

This publication discloses a method and system for delivering messages in a telecommunications network (1, 2, 6, 11, 12). In the method a voice-message call attempt is received (43), or a connection is formed to a potential user of a service, on the basis of a voice-message call attempt. According to the invention, as a response to the voice-message connection formed or to the call attempt, to the second part (41) of the connection is sent a text-form message, which initiates a long, logically continuous, temporally discontinuous session N, in such a way that the sender address (e.g., the A number) is converted to correspond to the session number N and the session stage J at the time, and in the message there is at least one selection query.

40 Claims, 4 Drawing Sheets

(56) References Cited

U.S. PATENT DOCUMENTS

| | | | |
|---|---|---|---|
| 5,940,818 A | 8/1999 | Malloy et al. | |
| 5,987,467 A | 11/1999 | Ross et al. | |
| 6,003,036 A | 12/1999 | Martin | |
| 6,085,100 A | 7/2000 | Tarnanen | |
| 6,104,870 A | 8/2000 | Frick et al. | |
| 6,199,076 B1 | 3/2001 | Logan et al. | |
| 6,236,968 B1 | 5/2001 | Kanevsky et al. | |
| 6,539,360 B1 | 3/2003 | Kadaba | |
| 6,560,456 B1 | 5/2003 | Lohtia et al. | |
| 6,564,261 B1 | 5/2003 | Gudjonsson et al. | |
| 6,625,461 B1 | 9/2003 | Bertacchi | |
| 6,639,919 B2 | 10/2003 | Kroninger et al. | |
| 6,772,336 B1 | 8/2004 | Dixon, Jr. | |
| 6,873,688 B1 | 3/2005 | Aarnio | |
| 6,990,332 B2 | 1/2006 | Vihinen | |
| 7,149,537 B1 | 12/2006 | Kupsch et al. | |
| 7,154,060 B2 | 12/2006 | Rosenbaum et al. | |
| 7,222,081 B1 | 5/2007 | Sone | |
| 7,406,429 B2 | 7/2008 | Salonen | |
| 7,451,118 B2 | 11/2008 | McMeen et al. | |
| 7,610,208 B2 | 10/2009 | Salonen | |
| 7,610,224 B2 | 10/2009 | Spiegel | |
| 7,619,584 B2 | 11/2009 | Wolf | |
| 7,660,397 B2 | 2/2010 | Heen et al. | |
| 7,844,674 B2 | 11/2010 | Madams et al. | |
| 7,996,023 B2 | 8/2011 | McGary et al. | |
| 8,050,664 B2 | 11/2011 | Salonen | |
| 8,145,245 B2 | 3/2012 | Aulu | |
| 8,359,242 B2 | 1/2013 | Guillot | |
| 2001/0037264 A1 | 11/2001 | Husemann et al. | |
| 2001/0049785 A1 | 12/2001 | Kawan et al. | |
| 2002/0028686 A1 | 3/2002 | Kagi | |
| 2002/0032589 A1 | 3/2002 | Shah | |
| 2002/0059146 A1 | 5/2002 | Keech | |
| 2002/0080822 A1 | 6/2002 | Brown et al. | |
| 2002/0104007 A1 | 8/2002 | Moodie et al. | |
| 2002/0111914 A1 | 8/2002 | Terada et al. | |
| 2002/0128908 A1 | 9/2002 | Levin et al. | |
| 2002/0165000 A1 | 11/2002 | Fok | |
| 2002/0173319 A1 | 11/2002 | Fostick | |
| 2002/0180696 A1 | 12/2002 | Maritzen et al. | |
| 2002/0184509 A1 | 12/2002 | Scheidt et al. | |
| 2002/0188562 A1 | 12/2002 | Igarashi | |
| 2002/0191795 A1 | 12/2002 | Wills | |
| 2003/0005126 A1 | 1/2003 | Schwartz et al. | |
| 2003/0101071 A1 | 5/2003 | Salonen | |
| 2003/0163536 A1 | 8/2003 | Pettine, Jr. | |
| 2003/0211844 A1 | 11/2003 | Omori | |
| 2004/0097247 A1 | 5/2004 | Vilkuna et al. | |
| 2004/0128158 A1 | 7/2004 | Salonen | |
| 2004/0128173 A1* | 7/2004 | Salonen | 705/5 |
| 2004/0139318 A1 | 7/2004 | Fiala et al. | |
| 2004/0157628 A1 | 8/2004 | Daniel et al. | |
| 2004/0185883 A1 | 9/2004 | Rukman | |
| 2004/0198322 A1 | 10/2004 | Mercer | |
| 2005/0027608 A1 | 2/2005 | Wiesmuller et al. | |
| 2005/0044042 A1 | 2/2005 | Mendiola et al. | |
| 2005/0054286 A1 | 3/2005 | Kanjilal | |
| 2005/0065995 A1* | 3/2005 | Milstein et al. | 709/202 |
| 2005/0102230 A1 | 5/2005 | Haidar | |
| 2005/0171738 A1 | 8/2005 | Kadaba | |
| 2005/0246209 A1 | 11/2005 | Salonen | |
| 2005/0268107 A1 | 12/2005 | Harris et al. | |
| 2006/0010085 A1 | 1/2006 | McMeen et al. | |
| 2006/0040682 A1 | 2/2006 | Goertz et al. | |
| 2006/0075139 A1 | 4/2006 | Jungck | |
| 2006/0131385 A1 | 6/2006 | Kim | |
| 2006/0168064 A1 | 7/2006 | Huynh et al. | |
| 2006/0224407 A1 | 10/2006 | Mills | |
| 2006/0271551 A1* | 11/2006 | Suojasto | 707/10 |
| 2007/0010266 A1* | 1/2007 | Chaudhuri | 455/466 |
| 2007/0047533 A1 | 3/2007 | Criddle et al. | |
| 2007/0105536 A1 | 5/2007 | Tingo, Jr. | |
| 2007/0123246 A1 | 5/2007 | Daniel et al. | |
| 2007/0135101 A1* | 6/2007 | Ramati et al. | 455/414.1 |
| 2007/0143230 A1 | 6/2007 | Narainsamy et al. | |
| 2007/0239578 A1 | 10/2007 | Gaida | |
| 2007/0288215 A1 | 12/2007 | Goldman | |
| 2008/0147408 A1 | 6/2008 | Da Palma | |
| 2008/0256191 A1 | 10/2008 | Murphy et al. | |
| 2008/0285475 A1 | 11/2008 | Menditto | |
| 2008/0317224 A1 | 12/2008 | Salonen | |
| 2009/0104925 A1 | 4/2009 | Aula | |
| 2009/0175422 A1 | 7/2009 | Marics et al. | |
| 2009/0264100 A1 | 10/2009 | Sapir et al. | |
| 2009/0281929 A1 | 11/2009 | Boitet et al. | |
| 2010/0030689 A1 | 2/2010 | Ramos et al. | |

FOREIGN PATENT DOCUMENTS

| | | |
|---|---|---|
| EP | 0967754 A2 | 12/1999 |
| EP | 1065899 A1 | 3/2001 |
| EP | 1458201 A1 | 9/2004 |
| EP | 1546938 A1 | 6/2005 |
| FI | 20011680 A | 2/2003 |
| FI | 000117663 B | 12/2006 |
| FI | 20060387 A | 10/2007 |
| FI | 000118586 B | 12/2007 |
| GB | 2391646 A | 11/2004 |
| GB | 2435565 A | 8/2007 |
| KR | 20040013261 A | 2/2004 |
| WO | 9706603 A2 | 2/1997 |
| WO | 0041102 A2 | 7/2000 |
| WO | 0052601 A1 | 9/2000 |
| WO | 0113299 A2 | 2/2001 |
| WO | 0139033 A1 | 5/2001 |
| WO | 0153991 A1 | 7/2001 |
| WO | 02067602 A1 | 8/2002 |
| WO | 2004019223 A1 | 3/2004 |
| WO | 2006122399 A1 | 11/2006 |
| WO | 2007063179 A1 | 6/2007 |
| WO | 2007122292 A1 | 11/2007 |
| WO | 2007125171 A1 | 11/2007 |
| WO | 2008017695 A2 | 2/2008 |
| WO | 2010000949 A1 | 1/2010 |

OTHER PUBLICATIONS

Content Gateway, Version 4.0; Development and Billing Manual; Jan. 1, 2005, Telia Sonera Finland Oy; www.sonera.fi/files/sonera.fi/.

Elisa Plc's Press Release; BookIT Ltd. and Elisa Implement a Handy Mobile Phone-Enabled Check-In Service for Finnair; Jun. 9, 2004; www.elisa.fi.

Elisa Plc's Press Release; Innovative Solution Receives 2004 European Good Practice Award in Occupational Health and Safety and the appendix BookIT case.pdf; Nov. 22, 2004.

Empower Interactive Group Ltd.; Virtual Mobile Redirector-Product Information Document; Unknown 2001.

Finnair Plc's Press Release; Finnair to Introduce the World's Easiest Check-In with a Text Message; Jun. 9, 2004; www.bookit.net/news.

Finnish Search Report; May 4, 2006.

Finnish Search Report; Jun. 3, 2009.

Kauppalehti; Mobiilipalvelujen Oltava Yksinkertaisia; BookIT:n Jukka Salonen uskoo tavallisiin tekstiviesteihin; Heikki Nenonen; Jun. 9, 2005; p. 19.

Mobileway; Mobileway Launches its Mobile Transaction Tracker Solution-An Interactive Platform to Authenticate Macropayment Made by Mobile Consumers; Jul. 2002; pp. 1-2; United States.

Mouly et al.; The GSM System for Mobile Communications; Unknown 1992; pp. 556-560; Palaiseau.

Penttinen; GSM-tekniikka; WSOY; Unknown 1999; pp. 155-157, 222 and 331-332; Porvoo.

Verkkouutiset; Sonera Tarjoaa Matkaviestinoperaattoreille Content Gateway-Palvelualustaa; Feb. 21, 2001; www.verkkouutiset.fi.

\* cited by examiner

- A VOICE-MESSAGE CALL ATTEMPT (CALL, VOIP-CONNECTION) IS RECEIVED, OR A CONNECTION TO A POTENTIAL USER OF THE SERVICE IS FORMED ON THE BASIS OF A VOICE-MESSAGE CALL ATTEMPT. — 40

- <u>AS A RESPONSE TO THE VOICE-MESSAGE CONNECTION FORMED OR THE CALL-ATTEMPT, TO THE POTENTIAL USER IS SENT A TEXT-FORM MESSAGE, WHICH INITIATES A LONG, LOGICALLY CONTINUOUS, TEMPORALLY DISCONTINUOUS SESSION N, IN SUCH A WAY THAT
  o THE SENDER ADDRESS (E.G., A NUMBER) IS CONVERTED TO CORRESPOND TO THE SESSION NUMBER N AND THE SESSION STAGE J, AND
  o THERE IS AT LEAST ONE SELECTION QUERY IN THE MESSAGE</u> — 41

- RECEIVE, AT THE SENDER ADDRESS DEFINED IN THE PREVIOUS STAGE, FROM THE USER OF MESSAGE SERVICE, A TEXT-FORM MESSAGE AND PROCEED ACCORDING TO THE CONTENTS OF THE MESSAGE.

- SEND THE NEXT TEXT-FORM MESSAGE OF SESSION N TO THE USER OF THE MESSAGE SERVICE, IN SUCH A WAY THAT
  o THE SENDER ADDRESS (E.G., A NUMBER) IS CONVERTED TO CORRESPOND TO THE SESSION NUMBER N AND THE NEW SESSION STAGE J. — 42

Fig. 4

METHOD AND SYSTEM FOR COMBINING TEXT AND VOICE MESSAGES IN A COMMUNICATIONS DIALOGUE

PRIORITY CLAIM

This patent application is a continuation of U.S. patent application Ser. No. 13/548,260, filed 13 Jul. 2012, which is a continuation of U.S. patent application Ser. No. 12/226,876, filed 6 Feb. 2009, now U.S. Pat. No. 8,260,330, which is a national phase of PCT/FI2007/050230, filed 26 Apr. 2007, which claims priority to Finnish Patent Application No. 20060420, filed 2 May 2006, the disclosures of which are incorporated herein by reference in their entirety.

FIELD OF INVENTION

The present invention relates to a system and a method for combining text and voice messages in a communications dialogue.

Methods and systems of this kind are used, for example, for implementing text-message based booking services.

BACKGROUND OF THE INVENTION

According to the prior art, initiating a dialogue has required a text-based initiation, which can be difficult from the user's point of view, and the situation can form a threshold question for starting to use the service. On the other hand, message dialogues are implemented purely on a text-message basis. A message dialogue may break, if it has been wished to make contact in the dialogue with the aid of a voice message, such as a voice call. The dialogue has had no support for voice messages; instead the voice message has remained an event external to the dialogue.

In addition, according to the prior art, bulk deliveries of e-mail messages have been implemented from a number inside operators' networks using Content Gateway technology. The delivery address of the Content Gateway bulk-delivery technology on the network side is not a familiar telephone number, which has the form +358 400 123 456, but is a short service number, which is not a real telephone number, but instead, for example 16400. Because it is not a real network number, it also cannot roam from one network to another, but goes directly to the content gateway of the operator in question. In the present document, the term roaming refers to either the updating of number information when a terminal device moves from one country to another, or the functionality of a service number when the service is used from a different country to that in which the service provider is located. Operators have constructed varied and complex solutions, by means of which services can be made to function also in other operators' networks and number spaces. In practice, this leads to complicated mutual agreements on the joint use of specific numbers, for example, by routing messages coming to a specific number of another operator back to the operator owning the number.

For years, attempts have been made to harmonize numbers on a European level, but the competing operators have never reached agreement on general service numbers. An additional drawback of the present technology is that, in the solution, the connection equipment inside the network of one operator should be connected with the corresponding connection equipment of all the other operators of networks (point to point). This creates a large number of agreements and connections from one place to another. Therefore in practice such solutions only function between a few operators.

The message bulk-delivery systems according to the prior art are thus implemented on a telephone-operator-specific basis, in such a way that the 'sender' field of the messages has shown the operator's own number, which as described above is not a roaming number. The services have therefore not functioned outside the operator's own country. Such a system is not suitable for query dialogues of a demanding type, as the use of the 'reply function' has always returned the messages to the same number and then only if the subscriber has been in their home network.

Attempts have also been made to solve the problem using tailor-made modem banks, but these solutions have been slow, expensive, and even unreliable.

SUMMARY OF THE INVENTION

The invention is intended to eliminate the defects of the prior art disclosed above and for this purpose create an entirely new type of method for combining text and voice messages in a communications dialogue.

One preferred embodiment of the invention concerns applying the aforementioned method to the bulk delivery of messages, and providing the invention for international use.

The invention is based on starting the message dialogue with a voice message. In practice, this takes place in such a way that a voice-message call attempt (voice-call or VOIP connection) is received, or a connection is formed with a potential user of the service on the basis of a voice-message call attempt, in response to the voice-message connection formed, or to the call attempt, to the potential user of the service is sent a text-form message, which initiates a long, logically continuous, temporally discontinuous session N, in such a way that the sender address (e.g., the A number) is altered to correspond to the session number N and the session stage J, and there is at least one selection query in the message.

According to a preferred embodiment of the invention, a message bulk-delivery method is used, in which case the desired reply address of each bulk-delivered message, typically the sender information, is converted to correspond to a predefined dialogue, in which the stage of the dialogue defines unequivocally the sender information, in which case the sending and reception of messages are implemented in different parts of the telecommunications network.

Considerable advantages are gained with the aid of the invention.

The voice-message possibility according to the invention facilitates the initiation of the service and creates flexibility in the dialogue. Flexibility can be implemented in a very user-friendly manner, in which case voice messages can be used to start very complex dialogues, thus avoiding unnecessary contacts that waste the user's time and also saving capacity in the communications network.

The preferred embodiments of the invention are operator-independent and will function in the networks of all operators. The most typical applications of the invention will function in the telephone of any GSM customer in any network whatever. The invention offers a cost advantage on the transmission side thanks to the bulk delivery while reception nevertheless operates entirely country-independently, i.e. in an entirely roaming manner from the network of each operator.

In the following, the invention is examined with the aid of examples and with reference to the accompanying drawings.

BRIEF DESCRIPTION OF THE DRAWINGS

FIG. 4 shows a flow diagram of a solution according to the invention.

DETAILED DESCRIPTION OF EXEMPLARY EMBODIMENTS

Figure 1:
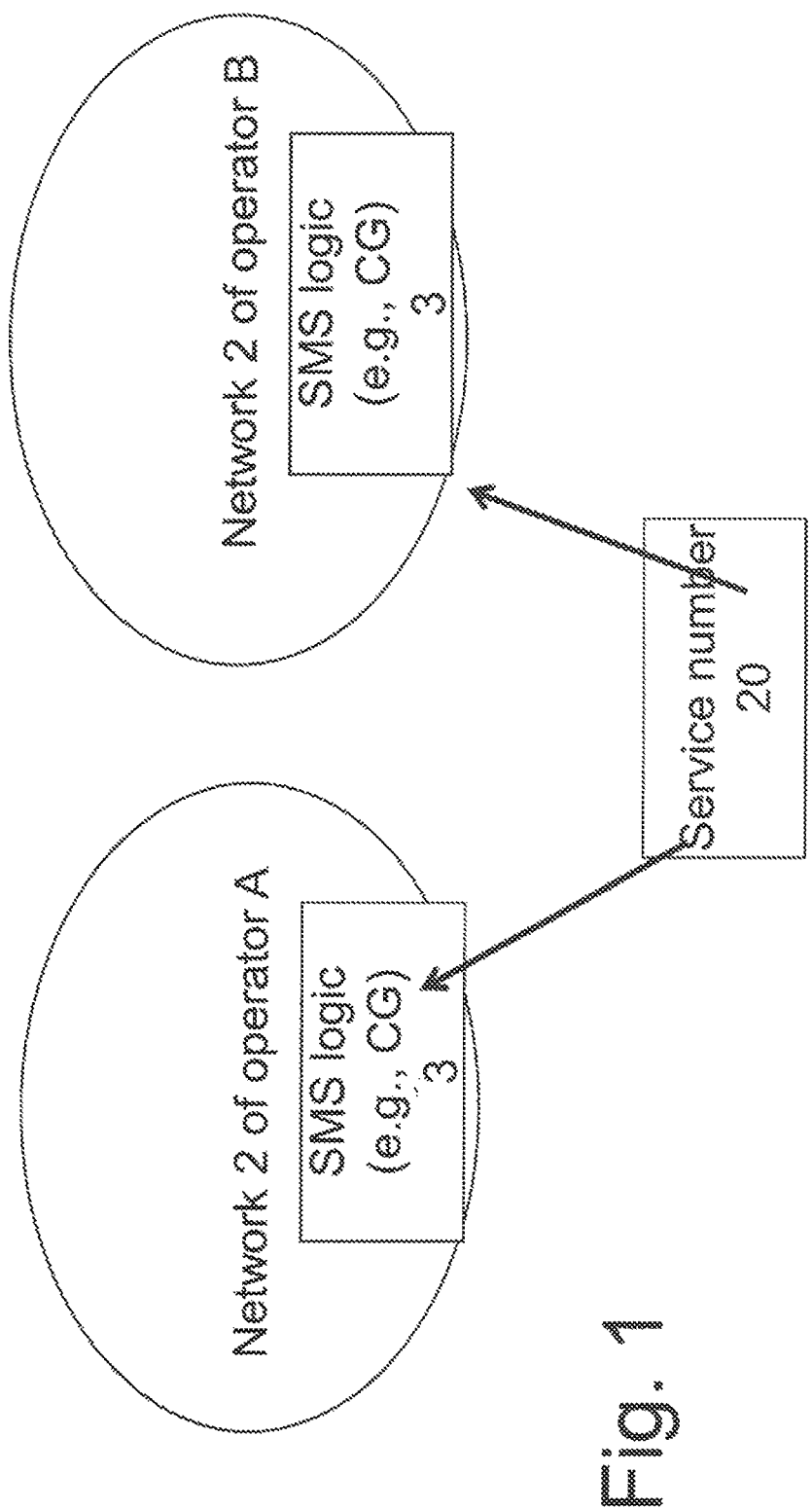
FIG. 1 shows schematically a solution according to the prior art.

According to FIG. 1, in the prior art telephone operators A and B have text-message bulk-delivery means 3 in their own networks, by means of which each operator can effectively deliver large numbers of text messages. In the solution shown, each operator has a service number 20 relating to the joint message service arranged by agreement and using connection technology, which is not available to other operators outside the agreement. According to the prior art, the service number 20 is a non-roaming short number.

Figure 2:
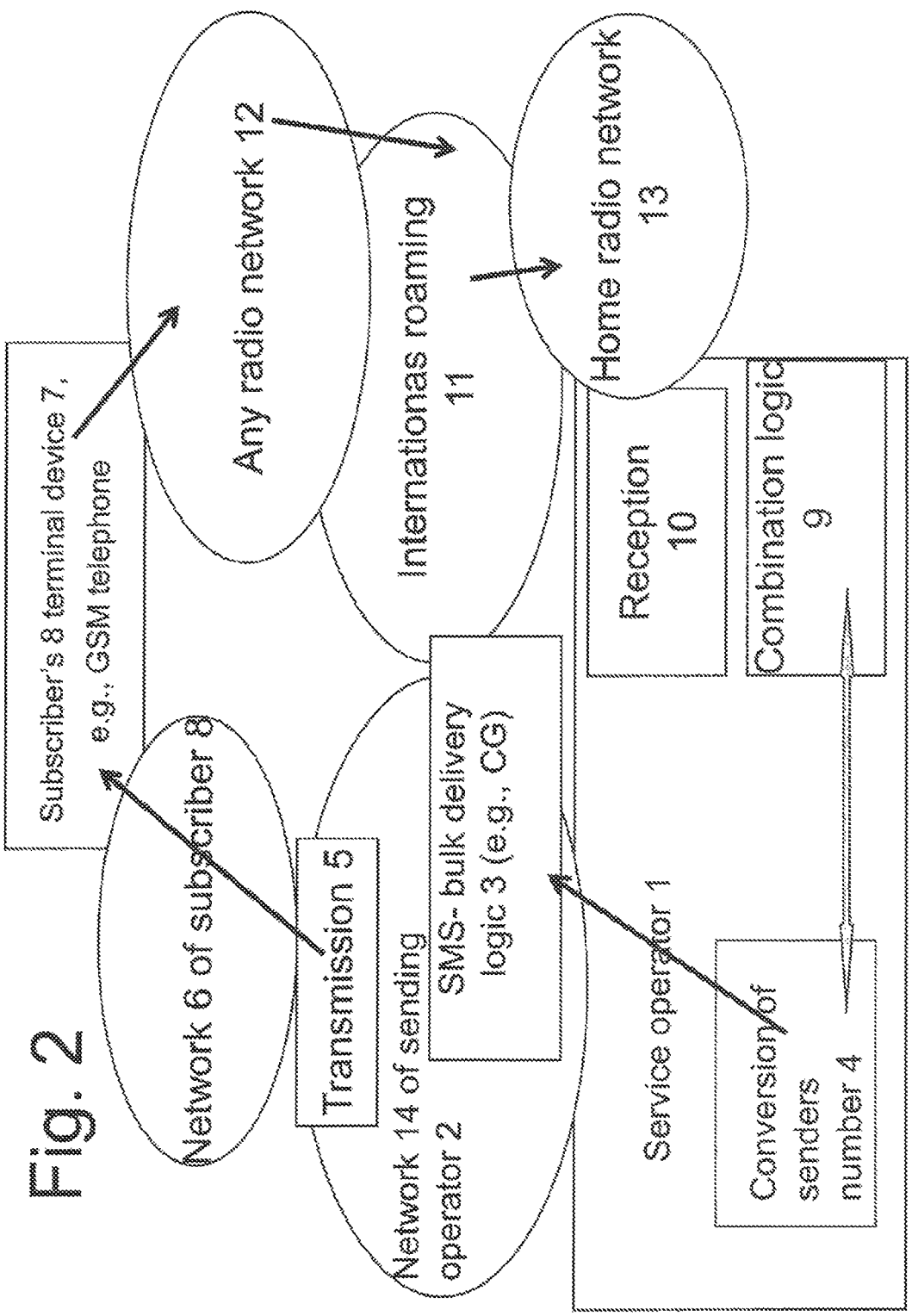
FIG. 2 shows a block diagram of a solution according to a preferred embodiment of the invention.

In the system according to FIG. 2, there are typically two parties, which in exceptional cases can be the same company.

The service providing service company or association 1, which provides subscribers 8, for example, with booking services for buying tickets, changing tyres, etc. The service company or association 1 operates in a radio network, the home network 13 of some operator.

In the present application, the term service company or association 1 refers to an association or company, which operates in either its own or an extraneous telecommunications network, and produces either directly or indirectly services for customers. Such a company or association is typically a sub-contractor of an actual telephone operator, nor does a user of the service necessarily even know of the existence of the service company or association 1. In a preferred embodiment of the invention, the service company or association 1 produces either directly or indirectly many kinds of booking and reservation services for telephone subscribers. The invention can also be used within a single association.

The system also includes a telephone operator 2, in the network 14 of which there are means and equipment for the bulk delivery of digital messages containing sender information (such as SMS messages). Such a practical network element is, for example, SMS bulk-delivery logic 3, which can be implemented, for example, using Content Gateway technology.

Figure 3:
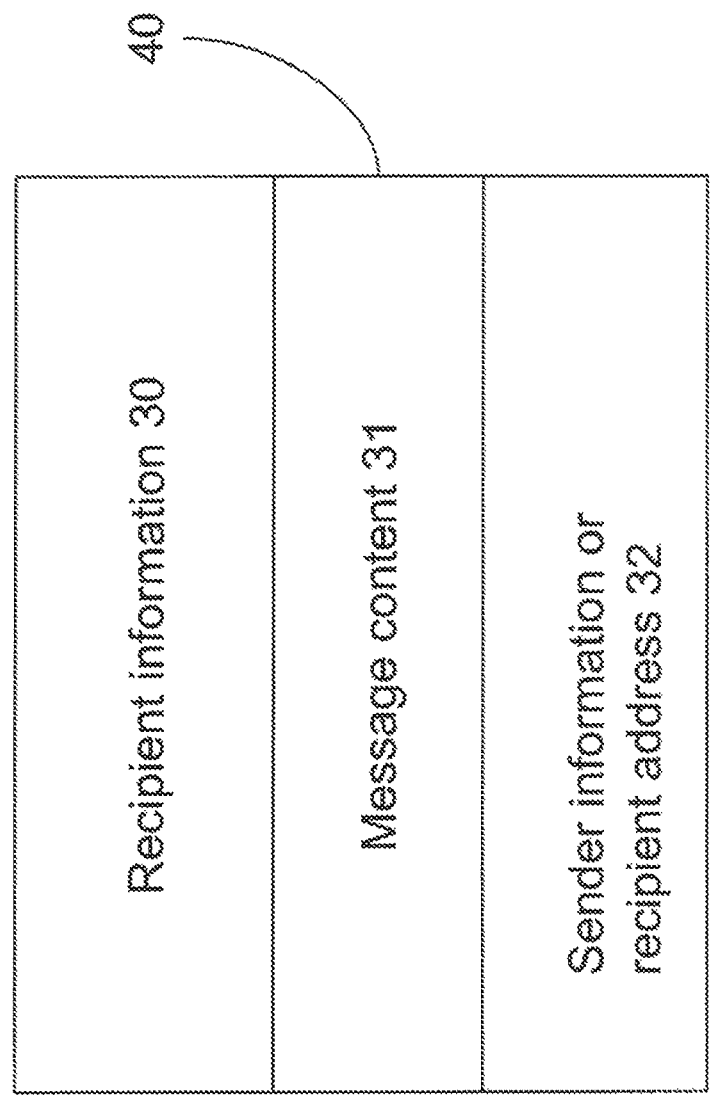
FIG. 3 shows schematically information fields in a message according to the invention.

With reference to FIGS. 2 and 3, in the first stage the service company or association 1 uses combination logic 9 and number conversion 4 to form a large number of messages 40, each of which contains recipient information 30, the actual message 31, and information 32 of either the sender or in practice the address, to which a reply to the message 40 is desired. In an SMS (Short Message System) application, the recipient information 30 is a mobile-station number and the sender information 32 is the sender information in the sender field 32 of the SMS message altered using a number converter 4.

Each of the aforementioned messages can be sent in response to a telephone call or call attempt of a user (subscriber).

Within the scope of the invention, the message 40 can be any message whatever that can be sent through a digital information network, which comprises recipient information, the actual message, and information on the desired reply address, for example, in the form of sender information. Such message 40 can be not only SMS messages, but also, for instance, e-mail messages, or, for example, multimedia messages (MMS).

A large number of the aforementioned messages can be formed dynamically on the basis of complex dialogues. Correspondingly, for example, in emergency applications, the message totality can be static and ready for an emergency situation.

In the conversion of the desired reply address, for example of the sender's number, it is possible to take into account the address (or number) from which the connection to the service company or association 1 has been formed. In this way, it is possible to route the messages of subscribers 8 in the USA to their own national server, and correspondingly the messages of Finnish users of the same service to their own national server. From these national servers, the reply messages can be transferred over suitable telecommunications links to the service company or association 1 for further measures.

The messages formed by the service company or association 1 are sent to the bulk-delivery logic 3, which is located in the operator's 2 network 14, from where the bulk delivery 5 of the messages is implemented. From here the messages 40 disperse always according to the recipient information 30 and arrive at the subscriber's 8 terminal 7 through the subscriber's 8 radio network 6 at the time. The subscriber 8 can reply to the message using the 'reply' function, in which case the reply message is sent to the address that is defined by the value of the sender or reply-address field 32. The message 40 leaves to the service company or association 1 through radio networks 12, 11, and 13. Naturally, if the subscriber 8 is within the area of the home network 13 of the service company or association 1, the message will not travel through the networks 11 and 12. From the home network 13, the message is transferred to the reception 10 of messages for the service company or association, where it is combined with a suitable dialogue with the aid of combination logic 9 and number conversion. In practice, networks 13 and 14 may be the same thing.

More concretely, for example, in an SMS application, when a message is sent to the subscriber 8, the sender's number (A number) is converted before bulk delivery in block 4, for example, to +358500001 in the first stage of a predefined session (dialogue). The number space of the sender's number (A number) is defined by the service provider's 1 own number space, which in the invention is entirely independent of the number space of the sending operator 2. In the following stage of the same session, the A number is, for example, +358500002, guided by the logic 9 of the service company or association 1, and so on. The sending A number is tightly defined from a logically progressing dialogue formed by the service provider 1, in which the reply to each message sent is awaited at a specific telephone number (digital reply address), which is contained in the message sent as the A number.

Thus, the subscriber replies to the SMS message using the reply function, so that in the first stage of the dialogue the reply goes to the number +35800001 and correspondingly in the second stage of the dialogue to the number +35800002.

Example of dialogue:

| Message | Sender's number |
| --- | --- |
| 1. Do you need to book a time for tyre changing, reply Y/N | +35850001 |
| 2. Is 07.12.2005 suitable, reply Y/N | +35850002 |

With the reply 'Y' of the subscriber 8 the system of the service provider 1 sends a message 2. The dialogue terminates, if the reply to the first message is 'N'. In stage 2, the reply 'Y' leads to the time being booked, whereas the reply 'N' leads to a new booking proposal.

The aforementioned message can be sent as a response to a telephone call or call attempt by the user (subscriber) to the service number of the tyre-changing company.

The messages described above are sent as a bulk delivery to hundreds/thousands of recipients at one time and the A number (=field 32) of the first stage of the dialogue would then always be +35850001 and correspondingly in the second stage of the dialogue always +35850002, so that the reply to each message sent will always be targeted to the right number. In connection with the reply, the A number of the sender 8 is, in turn, defined by the person for whom the booking is made.

According to FIG. 4, in block 43 a voice-message call attempt (voice call or VOIP connection) is received from a user (typically a subscriber), or a connection is formed to a potential user of the service on the basis of a voice-message call attempt. As a response to the formed voice-message connection or call attempt, a text-form message is sent to the potential user in accordance with block 41, which starts a long, logically continuous, temporally discontinuous session N, in such a way that the sender address (e.g. the A number) is converted to correspond to the session number N and the session stage J, and there is at least one selection query in the message.

The session N can continue, for example, as follows, in order to implement a long, logically continuous, temporally discontinuous session N: in stage 42, a text-form message is received, at the sender address defined in the previous stage, from the user of the message service, and the session proceeds according to the contents of the message.

After this, the next text-form message of session N is sent to the user of the message service, in such a way that the sender address (e.g. the A number) is converted to correspond to the session number N and the new session stage J.

According to the invention, a preferred embodiment is an SMS message, but according to the invention the message can be some other digital short message, in which it is possible to reply to the message, without separately defining the recipient. Thus the sender or reply-address field (field 32 in FIG. 3) can contain, instead of telephone-number information, the desired reply address in some other form, for example, as an e-mail address, or as numeric or alphanumeric sender or reply-address information.

Thanks to the number conversion, the message is typically received in an open radio network external to the network of the operator 2, which sent the message, and is routed on the basis of the A number to the system of the service company or association 1.

Thus, in the invention, in an SMS application, before bulk delivery the information of the 'sender' field of the text message is changed, in such a way that a different value is written in it to what the sender's number is in reality. This value is obtained from the logic 9, 10 of the service company or association 1, according to a predefined rule, in such a way that the queries and replies arriving in the logic can be combined.

In addition, in the system of the service company or association 1 there is logic 9 connecting the sending end and the receiving end, which can combine a sent message and its return message arriving from an extraneous operator 2, in such a way that the subscriber can reply (from outside the network) from any subscription whatever, but, however, the sending can take place from inside the network using a large capacity and economically. I.e. it is possible to select the cheapest sending operator, but receive from anywhere in the information network.

According to the invention, at the receiving end of the messages it is possible to disperse reception, in such a way that, for example, in Sweden reception takes place in a local network element and in Finland correspondingly in a Finnish network element, from which national network elements the received messages are transferred using suitable connections, for example, an IP link, to the system of the service company or association, for further processing. Thus the international roaming of the service is faster and cheaper, as well as more reliable. In addition, the use of the service is more pleasant for the consumer, because sending takes place to the number of a local operator, and not to the network of a foreign operator, which is considered to be expensive. In some subscriptions, a foreign message may even be blocked, i.e. they may not function without the service according to the invention.

One application of the invention is described in the following:

There are thousands of experts, who are needed in various catastrophe or emergency situations, or in other unexpected situations, where there is an acute need to have a large number of experts acting simultaneously. Often the situation is such that personnel is required in several locations simultaneously, in which case the emergency control centre will send messages concerning several locations. The personnel required then receives the message, using the system according to the invention, in their telephones and each recipient replies to the message that seems most appropriate. Thus the emergency control centre can decide on the basis of the replies who to send to which operation and in which area.

For example, after an earthquake an emergency control centre sends messages to thousands of emergency-aid specialists, using bulk-delivery logic, stating that help and expertise are required in Area 1, Area 2, and Area 3. When an emergency-aid specialist receives these three messages through his own operator, he can reply to the message that is the best alternative for him. The reply from the expert leaves through a radio network to the number defined by the message as an individual message through the service company or association 1 to the emergency control centre. Once the replies have been received, the server of the service provider 1 can combine the information on which expert is going to which of the areas 1-3. Thus the emergency control centre can act immediately and get the necessary personnel and equipment rapidly to their destinations.

The aforementioned message can be sent as a telephone call or call attempt by the user (subscriber) to the emergency control centre.

One application according to the invention is also the creation of a link to a person who travels globally in the service of an international major corporation. Large corporations typically have their own message communications centres, responding to the messages sent by which is difficult using existing technology, because if, for example, an American receives a group message from his company when he is in India, the 'reply' function cannot be used to reply to the message, because using existing technology there is a non-international number in the sender field. According to the invention, problems relating to both international roaming and also the further processing of the reply to the message are solved.

According to the invention, the aforementioned session can be initiated as a response to a telephone call or call attempt by the user (subscriber) to the company's service number.

If, according to what is stated above, a person who is a subscriber wishes to reply only to telephone numbers with the code of their own country, the service provider can send from its own country group messages as a mass sending, in which the number of the sender is converted to an internal number of the recipient's country and the recipients can reply in their own area, without international numbers. In that case, the service provider will require servers in the country in question. Reply messages from the country-specific server are transmitted, for instance, over an IP connection to a server in the service provider's country, in which there is combination logic.

In the invention, a number external to the network is thus converted into the sender's identifier (=the desired reply address), so that it must return through the radio interface of the network. Thus in the reply situation messages are not routed directly to a service number inside the network, but instead through a radio interface outside the network, so that it roams automatically. For this operation, in one preferred embodiment of the invention there is thus not the short number 16400, but instead the fully roaming international number +358 5016400.

According to the invention, for example, a thousand messages are sent at one time using a bulk-sending application 3, in such a way that each individual message is given converted sender information for the reply message, so that the return messages arrive at different times (as people gradually reply) through several radio modems, so that the momentary capacity required for each radio modem will be small. However, the operation of services outside the service provider's home country, i.e. roaming operation, is achieved with the aid of the invention.

In this application, the term sender information refers to both a telephone number (A number) and to any information whatever, transported with a message, concerning the desired return address.

The method and system according to the invention are implemented, with the aid of at least one computer, in a telecommunications network.

The preferred application environment of the solution according to the invention is disclosed in publication WO 2004/019223, Booking System, messages sent by the system applied to which can be implemented using the mass-sending method according to the present invention.

With the aid of the invention, if legislation so requires, the user's consent can be sought for the provision of a service including a long, logically continuous, temporally discontinuous session as a response to a first voice-message call or its attempt.

The invention claimed is:

1. A method comprising:
a network server communicating with at least one mobile device in the telecommunication network, wherein the communicating comprises the following operations performed by the network server:
receiving a voice-message call from a mobile device of a potential user of a product or service;
sending an initial text-form message to the mobile device of the potential user of the product or service as a response to the voice-message call attempt, wherein the initial text-form message initiates a logically continuous, temporally discontinuous session having a plurality of stages, each stage relating to at least one message associated with a sender and a recipient;
determining an address of the sender of at least one message in the session based on the session initiated by the initial text-form message and a number of a current stage in the session; and
including at least one selection query in at least one message in the session.

2. The method of claim 1, wherein the sender address is in an address format that enables roaming across inter-operator boundaries.

3. The method of claim 1, wherein the sender address comprises an Internet Protocol Address.

4. The method of claim 1, wherein the sending comprises utilizing a message bulk-delivery system within the telecommunications network.

5. The method of claim 1, wherein the text-form message comprises a Short Message Service message.

6. The method of claim 1, wherein the text-form message comprises a Multimedia Message Service message.

7. The method of claim 1, wherein the text-form message comprises an e-mail message.

8. The method of claim 1, wherein the selection query relates to purchasing of a product or service subject to payment.

9. The method of claim 8, wherein the product or service subject to payment comprises a service deliverable via the telecommunications network.

10. The method of claim 8, wherein the product or service subject to payment comprises a service deliverable external to the telecommunications network.

11. A method comprising:
a network server communicating with at least one mobile device in the telecommunication network, wherein the communicating comprises the following operations performed by the network server:
forming a connection to a potential user of a product or service based on a voice-message call attempt;
sending an initial text-form message to the mobile device of the potential user of the product or service as a response to the formed connection, wherein the initial text-form message initiates a logically continuous, temporally discontinuous session having a plurality of stages, each stage relating to at least one message associated with a sender and a recipient;
determining an address of the sender of at least one message in the session based on the session initiated by the initial text-form message and a number of a current stage in the session; and
including at least one selection query in at least one message in the session.

12. The method of claim 11, wherein the sender address is in an address format that enables roaming across inter-operator boundaries.

13. The method of claim 11, wherein the sender address comprises an Internet Protocol Address.

14. The method of claim 11, wherein the sending comprises utilizing a message bulk-delivery system within the telecommunications network.

15. The method of claim 11, wherein the text-form message comprises a Short Message Service message.

16. The method of claim 11, wherein the text-form message comprises a Multimedia Message Service message.

17. The method of claim 11, wherein the text-form message comprises an e-mail message.

18. The method of claim 11, wherein the selection query relates to purchasing of a product or service subject to payment.

19. The method of claim 18, wherein the product or service subject to payment comprises a service deliverable via the telecommunications network.

20. The method of claim 18, wherein the product or service subject to payment comprises a service deliverable external to the telecommunications network.

21. A network server comprising:
a processor that communicates with at least one mobile device in a telecommunication network, wherein the processor causes the network server to:
receive a voice-message call from a mobile device of a potential user of a product or service;
send an initial text-form message to the mobile device of the potential user of the service as a response to the voice-message call attempt, wherein the initial text-form message initiates a logically continuous, temporally discontinuous session having a plurality of stages, each stage relating to at least one message associated with a sender and a recipient;
determine an address of the sender of at least one message in the session is determined based on the session initiated by the initial text-form message and a number of a current stage in the session; and
include at least one selection query in at least one message in the session.

22. The network server of claim 21, wherein the sender address is in an address format that enables roaming across inter-operator boundaries.

23. The network server of claim 21, wherein the sender address comprises an Internet Protocol Address.

24. The network server of claim 21, wherein the sending comprises utilizing a message bulk-delivery system within the telecommunications network.

25. The network server of claim 21, wherein the text-form message comprises a Short Message Service message.

26. The network server of claim 21, wherein the text-form message comprises a Multimedia Message Service message.

27. The network server of claim 21, wherein the text-form message comprises an e-mail message.

28. The network server of claim 21, wherein the selection query relates to purchasing of a product or service subject to payment.

29. The network server of claim 28, wherein the product or service subject to payment comprises a service deliverable via the telecommunications network.

30. The network server of claim 28, wherein the product or service subject to payment comprises a service deliverable externally to the telecommunications network.

31. A network server comprising:
a processor that communicates with at least one mobile device in a telecommunication network, wherein the processor causes the network server to:
form a connection to a potential user of a product or service based on a voice-message call attempt;
send an initial text-form message to the mobile device of the potential user of the product or service as a response to the formed connection, wherein the initial text-form message initiates a logically continuous, temporally discontinuous session having a plurality of stages, each stage relating to at least one message associated with a sender and a recipient;
determine an address of the sender of at least one message in the session based on the session initiated by the initial text-form message and a number of a current stage in the session; and
include at least one selection query in at least one message in the session.

32. The network server of claim 31, wherein the sender address is in an address format that enables roaming across inter-operator boundaries.

33. The network server of claim 31, wherein the sender address comprises an Internet Protocol Address.

34. The network server of claim 31, wherein the sending comprises utilizing a message bulk-delivery system within the telecommunications network.

35. The network server of claim 31, wherein the text-form message comprises a Short Message Service message.

36. The network server of claim 31, wherein the text-form message comprises a Multimedia Message Service message.

37. The network server of claim 31, wherein the text-form message comprises an e-mail message.

38. The network server of claim 31, wherein the selection query relates to purchasing of a product or service subject to payment.

39. The network server of claim 38, wherein the product or service subject to payment comprises a service deliverable via the telecommunications network.

40. The network server of claim 38, wherein the product or service subject to payment comprises a service deliverable external to the telecommunications network.

\* \* \* \* \*